United States Patent
Wang et al.

(10) Patent No.: US 6,597,380 B1
(45) Date of Patent: Jul. 22, 2003

(54) IN-SPACE VIEWPOINT CONTROL DEVICE FOR USE IN INFORMATION VISUALIZATION SYSTEM

(75) Inventors: Shengjin Wang, Tokyo (JP); Kazuo Kunieda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/265,581

(22) Filed: Mar. 10, 1999

(30) Foreign Application Priority Data

Mar. 16, 1998 (JP) .......................................... 10/065900

(51) Int. Cl.$^7$ ................................................................. G09G 5/00

(52) U.S. Cl. ...................... 345/782; 345/850; 345/744; 345/851; 345/848

(58) Field of Search .................................. 345/419, 339, 345/782, 850, 851, 848, 852, 849, 744, 745, 747; 705/4, 329, 334, 340

(56) References Cited

U.S. PATENT DOCUMENTS

| | | | | |
|---|---|---|---|---|
| 5,821,942 A | * | 10/1998 | Avila et al. ............... | 345/424 |
| 5,995,903 A | * | 11/1999 | Smith et al. .............. | 701/211 |
| 6,078,329 A | * | 6/2000 | Umeki et al. ............. | 345/419 |
| 6,130,672 A | * | 10/2000 | Yamazaki et al. ........ | 345/427 |
| 6,268,862 B1 | * | 7/2001 | Uchiyama et al. ........ | 345/427 |
| 6,322,448 B1 | * | 11/2001 | Kaku et al. ............... | 463/32 |

FOREIGN PATENT DOCUMENTS

| | | |
|---|---|---|
| JP | 8-329281 | 12/1996 |
| JP | 9-151346 | 6/1997 |
| JP | 9-282483 | 10/1997 |

OTHER PUBLICATIONS

"Technical Report of IEICE (Institute of Electronics, Information and Communication Engineers)", OFS96–34, IE96–55, (Sep. 1996).
"Report of the Institute of Information Processing Research Group" 96–IM–28–7, Nov. 28, 1996.
OpenGL Programming Guide (Addison Wesley, Publishers, Japan, pp. 63–116).
"Graphics and Man–machine System" (Iwanami Bunko, Publishers, Tokyo, pp. 96–101).

* cited by examiner

*Primary Examiner*—Kristine Kincaid
*Assistant Examiner*—Mylinh Tran
(74) *Attorney, Agent, or Firm*—Whitham, Curtis & Christofferson, P.C.

(57) ABSTRACT

In an in-space viewpoint control device, a viewpoint control means comprises a recommend vector setting means, a viewpoint information determination means, a viewing point order calculation means, a viewpoint pass generating means, and a relevant information visualization control means. The recommend vector setting means sets recommend vectors for the object which reflects the intentions of the content designer. The viewpoint information determination means is determines a viewing direction and a viewpoint position in the space for viewing the object on the basis of the recommend vector information. The viewing point order calculation means is responsive when a plurality of recommend vectors are being set, as it determines a rotation order for each viewing point being determined in accordance with the recommend vector. The viewpoint pass generating means calculates an appropriate shifting pass for the viewing point following the calculated rotation order, such that the viewing point is shifted smoothly. The relevant information visualization control means is responsive to the user's decision of having relevant information displayed along with the object, as it controls their disposition, the place and direction of the viewing point such that they do not interfere with each other.

17 Claims, 13 Drawing Sheets

FIG. 4

| TYPE OF INFORMATION | ATTRIBUTE |
|---|---|
| VEHICLE INFO. | {VEHICLE ID, NAME, BRAND, YEAR MODEL, TYPE, ...} |
| OBJECT MANAGEMENT INFO. | {VEHICLE ID, EXHIBITION ROOM ID, ...} |
| 3D SPACE MOTION MANAGEMENT INFO. | {VIEWING DIRECTION, VIEWPOINT POSITION, VIEWPOINT ROTATION ANGLE, POINTING INFO., OPERATION TYPE, ...} |
| USER MANAGEMENT INFO. | {USER ID, ACCESS HISTORY, ...} |

FIG. 5
90 CONSTITUENTS OF RECOM. VECTOR
VIEWING CENTER: ○
VIEWING DIRECTION: ⟶
VIEWING UP-VECTOR: ⇨
VIEWING VOLUME: ⟶ (LENGTH)
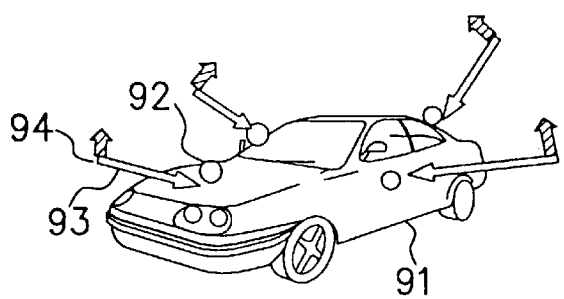
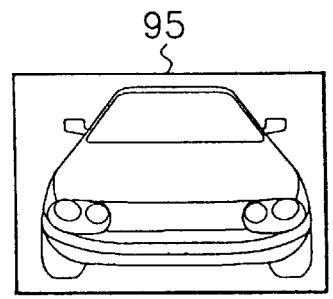

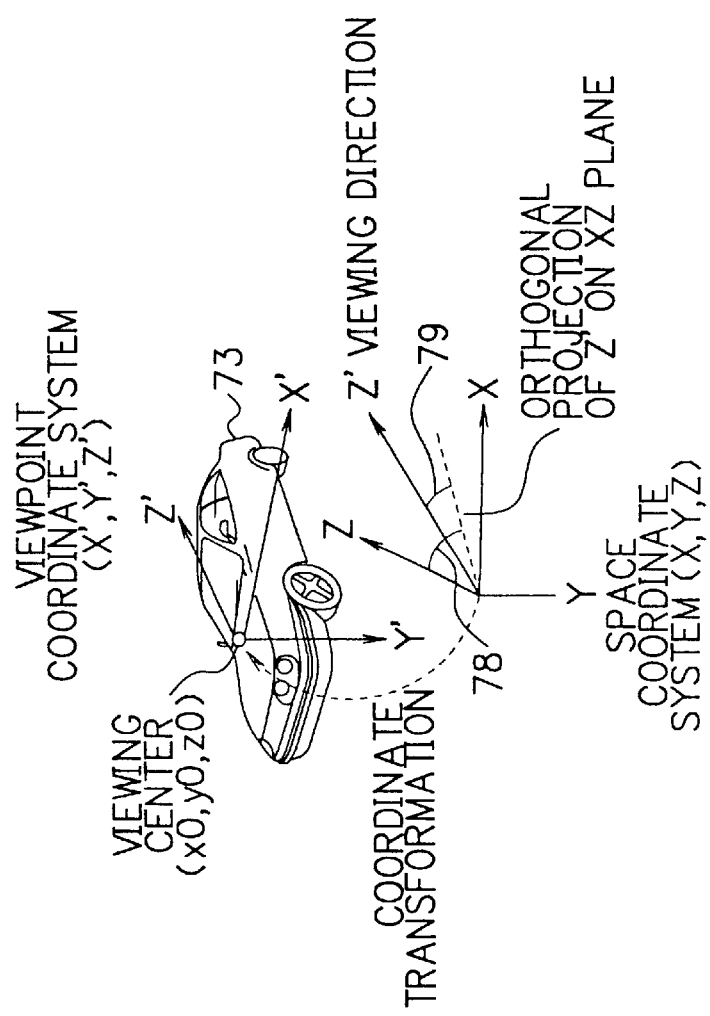

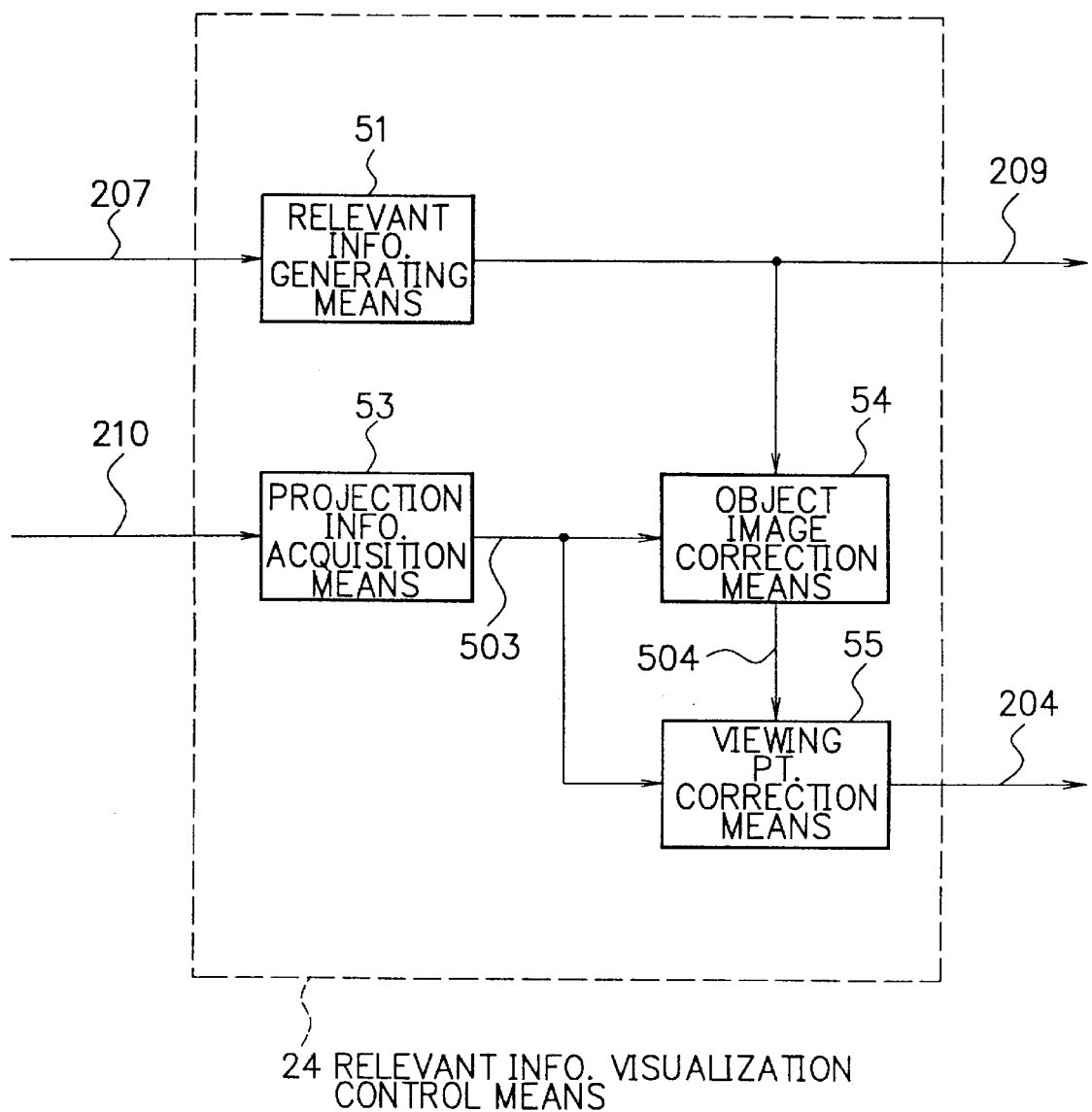

IN-SPACE VIEWPOINT CONTROL DEVICE FOR USE IN INFORMATION VISUALIZATION SYSTEM

BACKGROUND OF THE INVENTION

The present invention relates to an in-space viewpoint control device in use of displaying information by a computer while applying a virtual space, in an application of an electronic virtual museum, for example.

DESCRIPTION OF THE RELATED ART

As it has been noted typical in the field of information visualizing systems, such as the electronic virtual museum system using a computer, the art of embedding certain kinds of contents as objects to be visualized at predetermined positions in the virtual space (three-dimensional (3D) space) created by the computer has been widely adapted such that the contents can be viewed, and certain information services are made possible. The status-quo in the field has been reported in a Technical Report of IEICE (Institute of Electronics, Information and Communication Engineers) OFS96–34, IE96–55 (1996-09), a Report of the Institute of Information Processing Research Group 96-IM-28-7, etc.

According to such information visualizing system applying the above-described technique, the user has to conduct certain operations to adjust a position, direction and so forth of a virtual viewpoint in the 3D space, for displaying the objects on a screen in due order, and for selecting information embedded therein for viewing.

As to a system for controlling changes in position, direction etc. of the viewpoint (to be referred to as viewing pass information), for example, there are two types of systems. The first type of system would be a system in which the position, direction etc. of the viewpoint are calculated in response to a content of the user's operation, while moves of a mouse interlock with changes in a viewpoint position. The second type of system would be a system in which more than a single piece of viewing pass information are calculated according to the contents' positions and shapes of space so as to be recorded. Therefore, in this second type of system, the user can selectively use the recorded viewing pass information so as to view the contents.

In the meantime, many kinds of systems have been developed, which provide the user with information related to the contents (objects). For instance, when the object is a real life object, the relevant information would be bibliographical information etc. of the object. According to such a system, it is most common that one of the objects within a screen is selected by a direct pointing operation, or by selecting an icon or a menu presented on the screen, in order to additionally display the relevant information of the selected object.

With respect to each content to be visualized in a virtual space, there is a particular visualizing method reflecting intentions of a content designer, and it is considered as important that the designer's intentions are reflected upon the actual information visualization. In this respect, however, the conventional types of systems have the following shortcomings.

(1) Because the viewing pass information is calculated on the basis of the user's operation information, a shape of space, and information regarding the contents dispositions, it is noted as a problem that each display of content (object) does not reflect the original intentions of the content designer with respect to visualization.

(2) It is regarded that conditions of visualizing the focus content vary depending on the intentions of the content designer, and the user's operation. However, in respect with a prior art relevant information visualization control for providing the user with relevant information of the content for viewing, visualization conditions of the relevant information, i.e. a display position, size of the relevant information, etc. are automatically determined to fall in a certain arrangement which is being previously decided on the basis of screen coordinates. Therefore, the display of the relevant information would often interfere with the display of the object. Consequently, the user has to go through some trouble adjusting the position of the object or the relevant information manually, in order to view the object and the relevant information together on the same screen. This is also against the content designer's intentions.

SUMMARY OF THE INVENTION

It is an object of the present invention to provide an in-space viewpoint control device for displaying an object and relevant information thereof while reflecting intentions of the content designer.

In order to resolve the above objective, the present invention provides an in-space viewpoint control device applied in an information visualization system for providing the user with visualized information by embedding various contents as object images in desired places in a space image arranged in a virtual space so as to display the object images in turns along with the space image, comprising: a recommend vector setting means for setting recommend vector information which designates a recommended viewpoint of the object image; and a viewpoint information determination means for determining viewpoint information, which is used for displaying the object image, on the basis of the recommend vector information, thus displaying the object image in a way reflecting the intentions of a person who is responsible for setting the recommend vector information.

It is preferred that the above structure of the in-space viewpoint control device further comprises: a viewing point order determination means responsive when a plurality of recommend vectors are set with respect to the object image, as it assigns a rotation order to each viewing point of the object image which is determined by each vector; and a viewing point shifting means for shifting the viewing point of the object image in accordance with the rotation order.

It is also preferred that the in-space viewpoint control device further comprises a relevant information visualization control means responsive when the user selects to have relevant information of the object displayed together with the object image on the same screen, as it adjusts display status of the object and the relevant information so that they do not interfere with each other on the screen.

It is preferred that the viewpoint information determination means determines at least either one between a viewing point position and the viewing direction as viewpoint information in viewing the image of the object. It is also preferred that the viewing point shifting means determines a course of shifting for the viewing point of the object image on the basis of the rotation order, so as to shift the viewing point along the course of shifting.

The present invention also provides an in-space viewpoint control device applied in an information visualization system for providing the user with visualized information by embedding various contents as object images in desired places in a space image arranged in a virtual space so as to display the object images in turns along with the space image, comprising a relevant information visualization control means responsive when the user selects to have relevant information of the object displayed together with the object image on the same screen, as it adjusts display status of the object and the relevant information so that they do not interfere with each other on the screen.

BRIEF DESCRIPTION OF THE DRAWINGS

The above and further objects and the novel feature of the invention will more fully appear from the following detailed description when the same is read in connection with the accompanying drawings, in which:

FIG. 4 is a chart showing an example of relevant information of an object;

FIG. 5 is a diagram explaining constituents of a recommend vector;

FIG. 8A is a diagram explaining a relationship between a space coordinate system and a viewpoint coordinate system;

FIG. 8B is a diagram explaining a calculation of viewing point information;

FIG. 12 is a block diagram showing a structure of a relevant information visualization control means;

DESCRIPTION OF THE PREFERRED EMBODIMENTS

Figure 1:
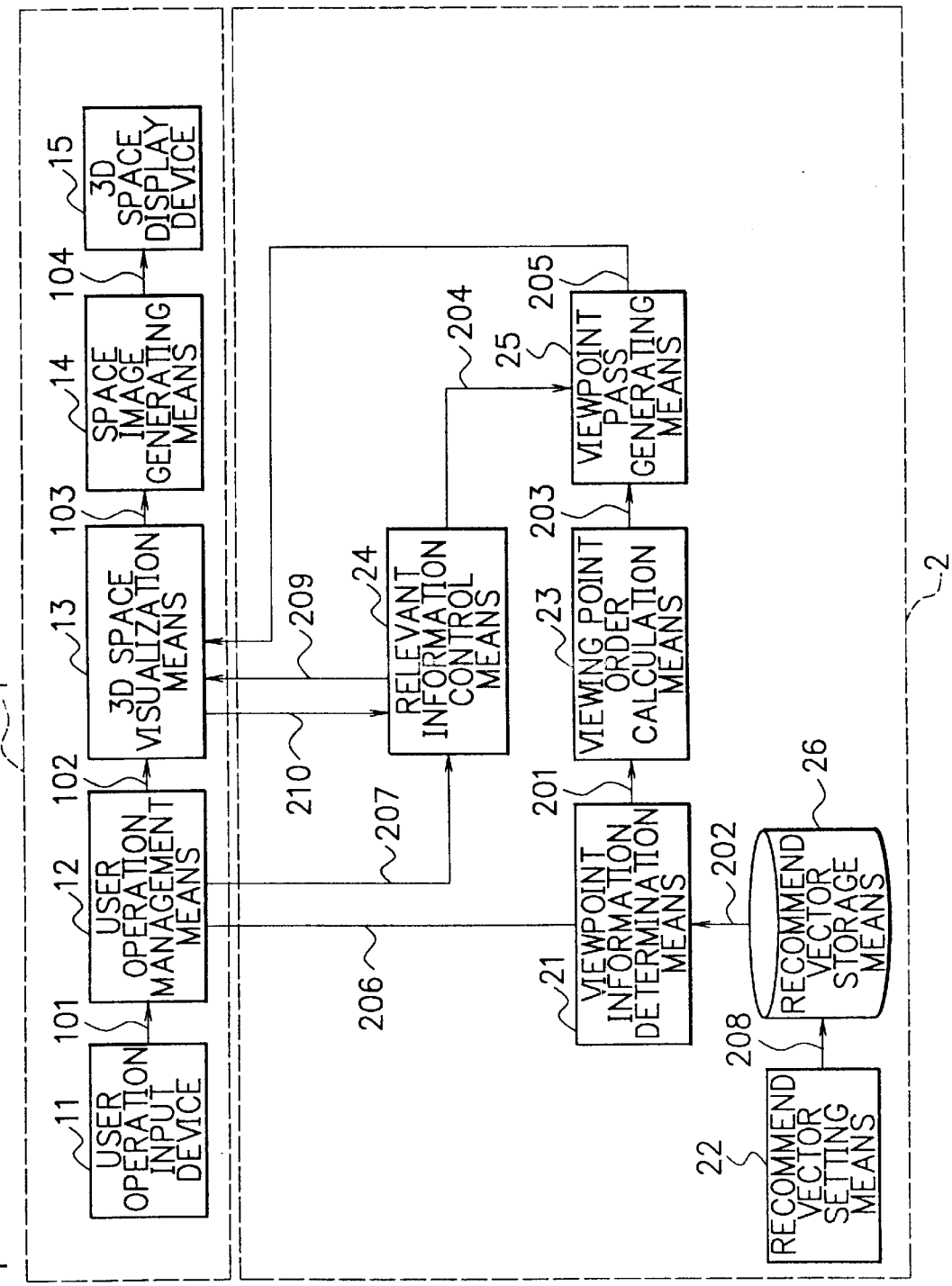
FIG. 1 is a diagram showing a configuration of an in-space viewpoint control device in an embodiment of the present invention.

Referring now to the drawings, a description of a preferred embodiment of the present invention will be given in detail.

FIG. 1 is a diagram showing a structure of an in-space viewpoint control device of the present invention.

The in-space viewpoint control device comprises an information visualizing means 1 and a viewpoint control means 2.

The information visualizing means 1 conducts information visualization by using a three-dimensional space and objects representing certain contents being embedded within the three-dimensional space. With the application of the viewpoint control means 2, viewpoint pass information reflecting the intentions of the content designer is automatically generated by the user's operation and recommend vectors being set to the object. Further, in a case where the relevant information of the content is to be provided to the user, the object and the relevant information can be displayed together on the same screen by generating a certain viewing point pass such that the relevant information and the object will not interfere with each other. Here the viewing point pass is generated on the basis of a screen size of the relevant information. Accordingly, it becomes possible for the user to effectively view the object and refer to the relevant information at the same time. Note that a three-dimensional virtual space and a three-dimensional space have the same definition.

The information visualizing means 1 comprises a user operation input device 11, a user operation management means 12, a three-dimentional space visualizing means 13, a space image generating means 14, and a three-dimentional space display device 15.

The user operation input device 11 is provided for the user to operate on the screen. The user operation management means 12 is to generate a space updating request 102 on the basis of the user operation information 101 from the user operation input device 11 and the current display content. The space updating request 102, for example, is a request for changing a viewing direction and a viewpoint position within a three-dimentional space. The three-dimentional space visualizing means 13 is for updating the state of a three-dimentional space so that new information can be displayed in response to the space updating request 102. The space image generating means 14 is for generating a space image 104 in response to three-dimentional space information 103 generated by the three-dimentional space visualizing means 13. The three-dimentional space display device 15 is for displaying the space image 104 for the user to view.

The viewpoint control means 2 comprises a recommend vector setting means 22, a recommend vector storage means 26, a viewpoint information determination means 21, a viewing point order calculation means 23, a relevant information visualization control means 24, and a viewpoint pass generating means 25.

The recommend vector setting means 22 previously sets information for executing a viewpoint control appropriate for viewing, as recommend vectors 208. The information includes for instance, the object's center coordinates, viewing direction, angle of visibility, viewing volume etc. The recommend vector storage means 26 stores the recommend vectors 208 such that they correspond to a certain object. The viewpoint information determination means 21 generates viewing point information 201 in compliance with an object select instruction 206 from the user operation management means 12 and recommend vector information 202. The viewing point order calculation means 23 receives the viewing point information 201 relating to a plurality of objects, so that they are given their order and such order information is outputted as viewing point order information 203. The relevant information visualization control means 24 generates relevant information visualizing information on the basis of a relevant information indication instruction 207 and object image information 210 so as to have the relevant information visualized. At the same time, the relevant information visualization control means 24 generates viewing point correction information 204 which is used in arranging the object and its relevant information on the screen in a manner such that they do not interfere with each other on the screen. The viewpoint pass generating means 25 generates viewing point pass information 205 representative of a moving course of the viewing point according to the viewing point order information 203 and the viewing point correction information 204.

Figure 2:
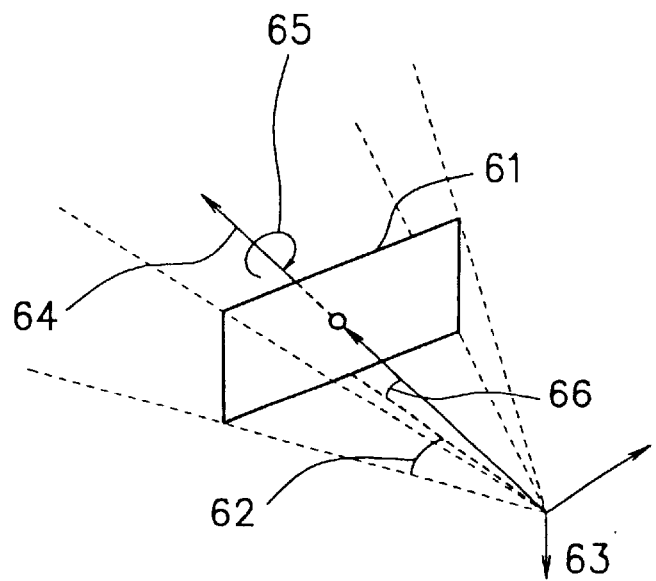
FIG. 2 is a diagram explaining constituents of a viewpoint.
Figure 3:
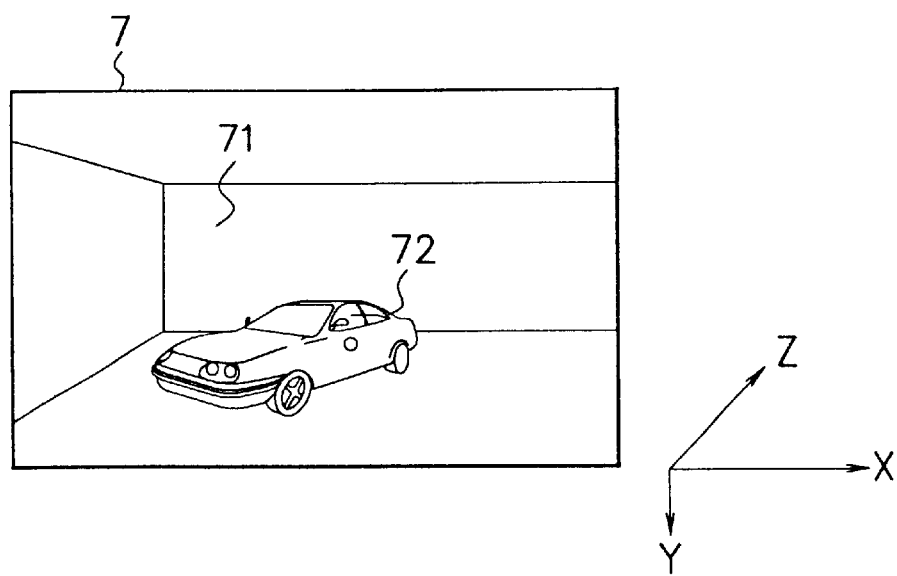
FIG. 3 is a diagram showing an example of a screen display in an information visualization system.

Here, a viewpoint, an object, and relevant information according to the present embodiment will be described with reference to FIGS. 2, 3, and 4. The viewpoint as defined in this embodiment has the following geometrical constituents including a viewing direction 64, a viewpoint position 63, angles of visibility, a viewpoint rotation angle 65, i.e. a rotation angle around the axis represented by a viewing direction 64, and the clipping plane 61. The viewpoint is therefore, defined by those constituents maintaining such relationships in a three-dimentional space as shown in FIG. 2. In this respect, the particulars are explained in "OpenGL Programming Guide" (Addison Wesley, Publishers, Japan, pp. 63–116) using a three-dimentional space camera which is being commonly used in an application of computer graphics based on perspective projection.

In accordance with the present embodiment, the objects are defined as images being displayed for visualizing a plurality of contents at any desired place within the three-dimensional space. For example, FIG. 3 is one example of a screen display for the user to view, in which an image of a vehicle (object) 72 is arranged inside a three-dimensional exhibition room 71 which is created by an application of computer graphics. In this embodiment, as shown in FIG. 3, the vehicle 72 serves as an object.

Furthermore, a display screen 7 shows an image of a three-dimensional virtual space being projected on the clipping plane 61 shown in FIG. 2 before being displayed on the three-dimensional space display device 15. The user alters the viewpoint constituents (viewing direction, viewpoint position etc.) as shown in FIG. 2 by an application of a work-around operation etc. In such operation, visual objects appear on the screen in turns, by which the user can view or observe the visualized contents.

Now referring to a relevant information list 87 shown in FIG. 4, relevant information of the vehicle 72 (object) being arranged as a content within a virtual exhibition room will be described as visualized vehicle information.

The vehicle information is subjected to visualization, and is usually stored in a data base. Object management information is used in the three-dimensional space visualizing means 13, and is being composed of information linking each piece of vehicle information and an image of the vehicle generated by computer graphics, i.e. the object to be viewed, and position information of the object within a three-dimensional space.

Three-dimensional space motion management information is information representing the status-quo of the three-dimensional space. Therefore, it changes in accordance with interactions between the user. The three-dimensional space motion management information includes, for example, information relating to the viewpoint constituents (viewpoint position, viewing direction etc.) as shown in FIG. 2, types of user's operation, pointing information etc., and is put under management of the three-dimensional space visualizing means 13.

User management information comprises user IDs of the system users, history of each user's access to the vehicle information etc., and is put under management of the user operation management means 12.

Among the types of information described above, all the information being searched by a general search when the vehicle ID is included as a search condition, and all the information including the same vehicle ID being searched as a result of an arbitrary search are the relevant information. In other words, in accordance with the embodiment of the present invention, an attribute value of the vehicle information as a content, a class of superordinate where the content belongs, information concerning the relation between the user and the content, etc. can all be listed as the relevant information.

In the following, details of the present invention will be given. Firstly the recommend vector setting means 22 will be described with reference to FIG. 1, FIG. 2, and FIG. 5.

FIG. 5 is a diagram for explaining the setting particulars in the application of the recommend vector setting means 22, in case when a vehicle is applied as an object.

The recommend vector setting means 22 is a means for setting information concerning more than a single viewpoint, i.e. a recommend viewing point, where effective screen display is possible in viewing each object as a recommend vector. Here, in a first method of acquiring the recommend vector, the values for the viewpoint position, the viewing direction, the rotation angle of viewing, the angle of visibility etc. being explained as the viewpoint constituents in FIG. 2, are converted into relative values on the basis of position information of the object. Furthermore, as a second method, it is also possible to construct a recommend vector method using object-based information as shown in FIG. 5.

In the example of FIG. 5, viewing center, viewing direction, viewing up-vector and viewing volume are shown as constituents of a recommend vector. The viewing center is position information (coordinates) indicating a portion of an object to be positioned in the center of the screen when conducting a screen display from the recommend viewing point. The viewing direction is a vector stretching from the recommend viewing point toward the viewing point. The viewing up-vector is rotation information around the viewing direction as an axis. The viewing volume designates an extent of occupation by the display region of the object in the screen display region, when carrying out a screen display.

In the example shown in FIG. 5, one recommend vector for a vehicle 91 (object) includes the following factors: a viewing center 92 (e.g. a hood); viewing direction information 93 (e.g. an angle of 10° downward); viewing up-vector information 94 (e.g. a condition suggesting that a ceiling of the vertical exhibition room and the top and the bottom of the screen are positioned so that they are parallel to one another); viewing volume information, i.e. a ratio of the object's occupation in an assumed screen display 95 (e.g. a ratio suggesting that the object fits just within the designated screen size).

When applying the second method, the viewpoint constituents (viewpoint position, viewing direction, rotation angle of viewing, angle of visibility etc.) which finally decide the content of a screen display can be calculated from the recommend vector, i.e. viewing center, viewing direction, viewing up-vector, viewing volume, and other information of the object such as coordinates and size of the object within the space. Even in such a case where a size of a display region of the screen, a size of the object etc. are changed, the viewpoint constituents can be calculated referring to such changes. Therefore, the object can be easily visualized giving less sense of incompatibility to the user.

Furthermore, in using either the first method or the second method, it is possible to set a plurality of recommend vectors for each object.

The process by the recommend vector setting means 22 is conducted prior to the information visualization, and the generated recommend vector is made to correspond with the object to be stored in the recommend vector storage means 26. In other words, the recommend vector can be set as only being dependent on the content of the object, and independently from the system's implementation environment. Therefore, the object designer or the person who sets the recommend vector can set the recommend vector individually, without having to know in what system the object will be used or how the object will be used in the system.

Here, in a first working method for setting the recommend vector constituents, i.e. viewing center, viewing direction, viewing up-vector, and viewing volume, some visual parts such as arrow and circle as shown in FIG. 5, which are made to correspond with the constituents of the recommend vector are arranged, and then those visual parts are arranged in the three-dimentional space on the basis of the object (e.g. a vehicle), under a three-dimentional CAD system which is regarded as a widely known system.

In a second working method for setting the recommend vector constituents, within a space where an object (e.g. a vehicle) is arranged in a widely known 3D walk-through system, a walk-through operation is executed so that a status of the viewpoint, i.e. a display content of the screen, is set as a desired status (e.g. the state of presumed screen display 95 in FIG. 5), at which point the constituents of the recommend vector are calculated back from the information of the viewpoint constituents, so as to set the recommend vector.

Figure 6:
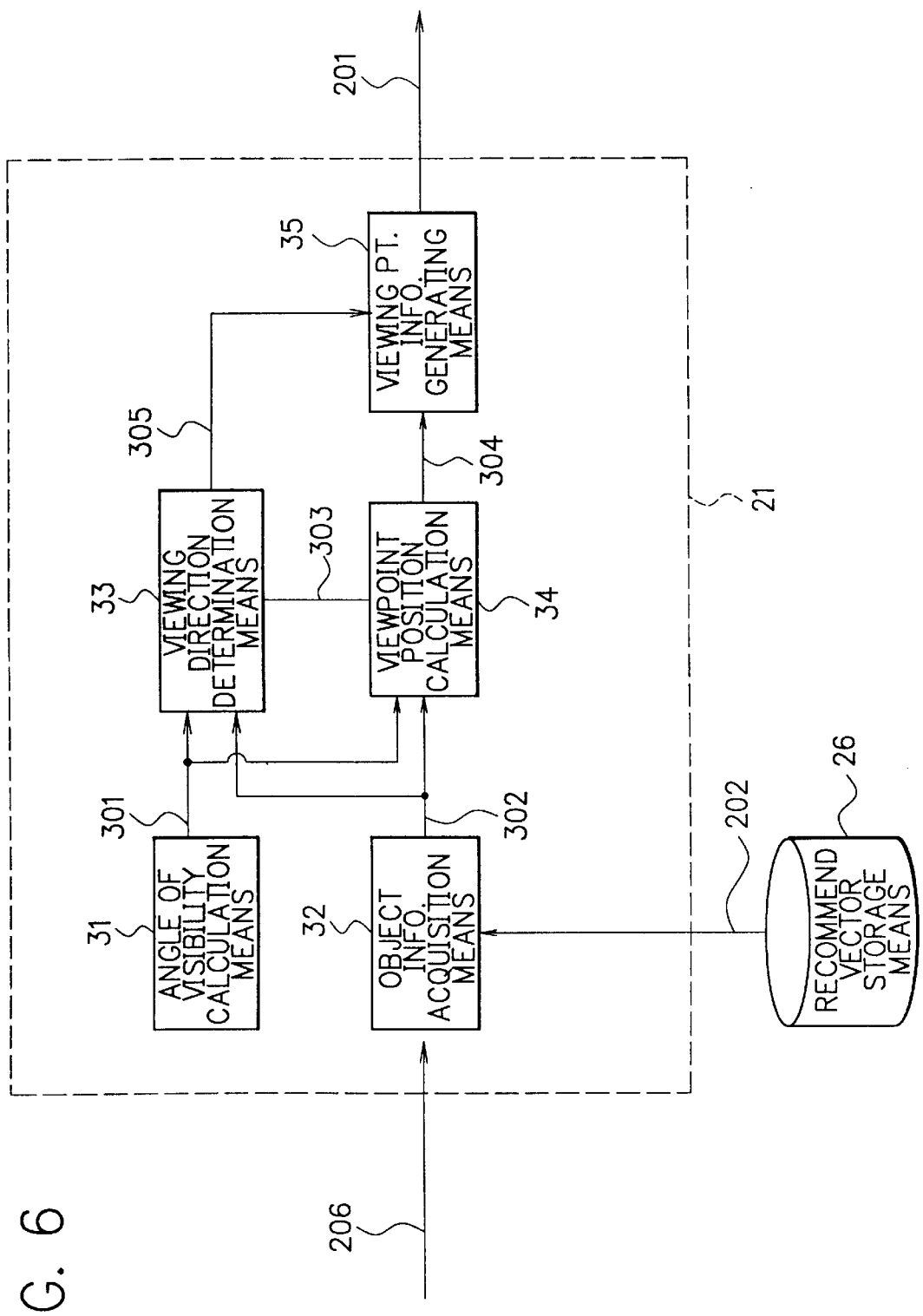
FIG. 6 is a block diagram showing a structure of a viewpoint information determination means.

Next, referring to FIGS. 1 to 3, and FIGS. 5 to 8A, 8B, a description of the viewpoint information determination means 21 will be explained in detail. FIG. 6 is a block diagram showing the structure of the viewpoint information determination means 21 shown in FIG. 1. The viewpoint information determination means 21 is provided for calculating viewpoint information for visualizing the object on the basis of the recommend vector information.

The viewpoint information determination means 21 comprises an object information acquisition means 32, an angle of visibility calculation means 31, a viewing direction determination means 33, a viewpoint position calculation means 34, and a viewing point information generating means 35.

The object information acquisition means 32 takes out the recommend vector information 202 from the recommend vector storage means 26, while the recommend vector information 202 corresponds to the object being selected in response to the object selecting instruction 206 from the user operation management means 12 as shown in FIG. 1. At the same time, the object information acquisition means 21 also outputs object space information 302, the object space information 302 being a piece of information indicating a state of each object, e.g. center coordinates, size, etc. in an unified form. The angle of visibility calculation means 31 generates angle of visibility information 301 on the basis of the screen environment of the system. The viewing direction determination means 33 calculates the viewing direction information 305 on the basis of the object space information 302 and the angle of visibility information 301. The viewpoint position determination means 34 calculates viewpoint space position information 304 on the basis of the object space information 302 and the viewing direction information 303. The viewing point information generating means 35 generates viewing point information 201 on the basis of the viewing direction information 305 and the viewpoint space position information 304.

Referring to FIG. 7A through FIG. 7H, the recommend vector and the viewing point information 201 which is determined by the viewpoint information determination means 21 will be described, while the object (vehicle 73) is to be exhibited in the three-dimentional virtual exhibition room.

Figure 7A:
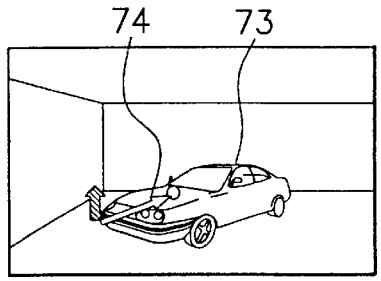
FIG. 7A is a diagram showing a recommend vector set to an object (vehicle)

FIG. 7A shows an example where a recommend vector (a) 74 is set such that a viewing center is set at a front window of the vehicle 73, a viewing direction is a direction set from a front of the vehicle toward the vehicle, a viewing up-vector is set such that a floor of the 3D virtual exhibition room becomes parallel with the top and the bottom of the screen, and a viewing volume is designated as a ratio by which the vehicle can fit just within a size of the screen. In the viewpoint information determination means 21, the viewing point information 201 including viewpoint position, viewing direction, angle of visibility, etc. is calculated according to the recommend vector (a) such that the screen display will look like FIG. 7B.

Figure 7B:
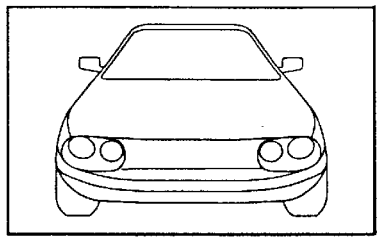
FIG. 7B is a diagram showing a screen display corresponding to the recommend vector shown in FIG. 7A.
Figure 7C:
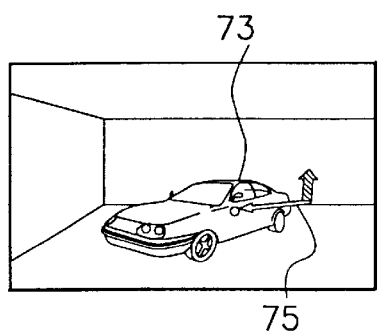
FIG. 7C is a diagram showing a recommend vector set to an object (vehicle)
Figure 7D:
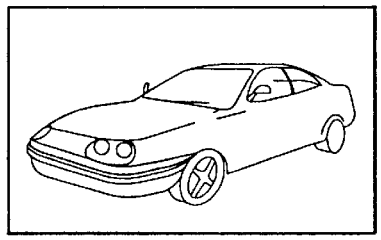
FIG. 7D is a diagram showing a screen display corresponding to the recommend vector shown in FIG. 7C.

FIG. 7C shows an example where a recommend vector (b) 75 is set such that a viewing center is set at a left side window of the vehicle 73, a viewing direction is a direction set from a left front of the vehicle toward the vehicle, a viewing up-vector is set such that a floor of the 3D virtual exhibition room becomes parallel with the top and the bottom of the screen, and a viewing volume is designated as a ratio by which the vehicle can fit just within a size of the screen. In the viewpoint information determination means 21, the viewpoint information 201 including viewpoint position, viewing direction, angle of visibility, etc. is calculated according to the recommend vector (b) such that the screen display will look like FIG. 7D.

Figure 7E:
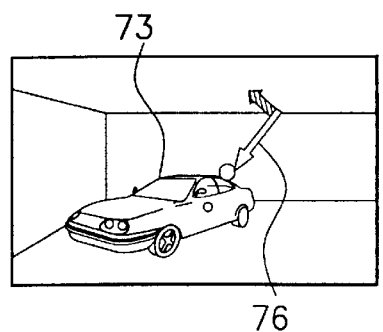
FIG. 7E is a diagram showing a recommend vector set to an object (vehicle)
Figure 7F:
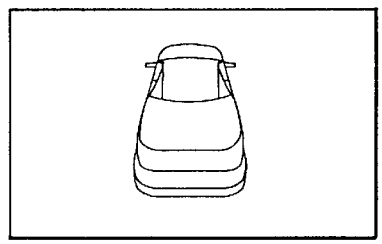
FIG. 7F is a diagram showing a screen display corresponding to the recommend vector shown in FIG. 7E.

FIG. 7E shows an example where a recommend vector (c) 76 is set such that a viewing center is set at a rear window of the vehicle 73, a viewing direction is a direction set from an upper back of the vehicle down toward the vehicle at an angle of 45 degrees, a viewing up-vector is set such that a floor of the 3D virtual exhibition room becomes parallel with the top and the bottom of the screen, and a viewing volume is designated as a ratio by which the vehicle can fit just within a size of the screen. In the viewpoint information determination means 21, the viewing point information 201 including viewpoint position, viewing direction, angle of visibility, etc. is calculated according to the recommend vector (c) such that the screen display will look like FIG. 7F.

Figure 7G:
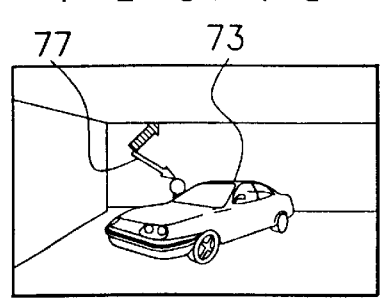
FIG. 7G is a diagram showing a recommend vector set to an object (vehicle)
Figure 7H:
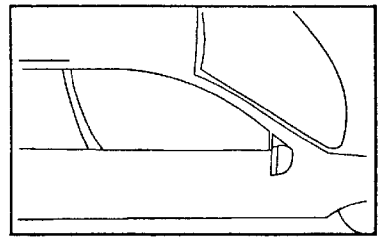
FIG. 7H is a diagram showing a screen display corresponding to the recommend vector shown in FIG. 7G.

FIG. 7G shows an example where a recommend vector (d) 77 is set such that a viewing center is set at a right side window of the vehicle 73, a viewing direction is a direction set from an upper right side of the vehicle toward the vehicle, a viewing up-vector is set such that a floor of the 3D virtual exhibition room becomes parallel with the top and the bottom of the screen, and a viewing volume is designated as a ratio by which the vehicle can fit just within a size of the screen. In the viewpoint information determination means 21, the viewing point information 201 including viewpoint position, viewing direction, angle of visibility, etc. is calculated according to the recommend vector (d) such that the screen display will look like FIG. 7H.

Next, using the recommend vector (a) 74 in FIG. 7A as an example, a working method for calculating the viewing point information 201 will be explained with reference to FIG. 8A and FIG. 8B. In order to simplify the following description, there is applied a coordinate system in which the display screen is a basis, an X axis represents a horizontal direction of the screen, a Y axis represents a vertical direction of the screen, and a Z axis represents a depth of the screen.

FIG. 8A is a diagram explaining the relationship between a space coordinate system including three axes, i.e. X, Y, and Z constructing a three-dimensional virtual space and a viewpoint coordinate system including three axes, i.e. X', Y', and Z' which are newly arranged. FIG. 8B is a diagram which explains a method of calculating a position of a viewing point on the viewpoint coordinate system.

When there is a need to visualize the vehicle 73 (object) in response to the user's operation etc., firstly, angles of visibility at the moment corresponding to a horizontal angle of visibility 62 and a vertical angle of visibility 66 as shown in FIG. 5 are obtained from the system by the angle of visibility calculation means 31. Next, the viewing direction is obtained from the recommend vector of the vehicle 73 (object). A vector of the obtained viewing direction will overlap the Z' axis of the viewpoint coordinate system, and the viewpoint coordinate system is set such that a viewing center will become the origin of the coordinate system. Next, the coordinate value of each point of the vehicle 73 (object) will be transformed from the space coordinate system to the viewpoint coordinate system by the following formula (1).

$$x'=(x-x0)\cos\theta-(z-z0)\sin\theta$$

$$y'=-(x-x0)\sin\phi\sin\theta+(y-y0)\cos\phi-(z-z0)\sin\phi\cos\theta$$

$$z'=-(x-x0)\cos\phi\sin\theta+(y-y0)\sin\phi+(z-z0)\cos\phi\cos\theta \quad (1)$$

Figure 9A:
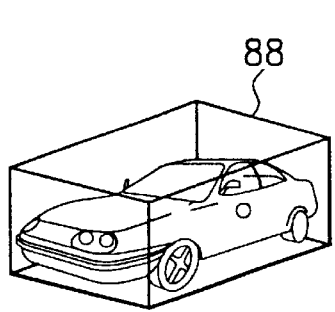
FIG. 9A is a diagram showing a range box of the object.

In this case, coordinates (x0, y0, z0) are center coordinates of the space coordinate system, and $\theta$ and $\phi$ represent Z axis horizontal rotation angle 78 and Z axis vertical rotation angle 79, respectively. As one possibility, points which are subjected to conversion can be the points which characterize the shape of the vehicle 73 (object), e.g. the whole vertices. As to another possibility, a rectangular parallelopiped containing the vehicle (object) which volume being the minimum is calculated, so that vertices thereof are transformed. Such rectangular parallelopiped will be referred to as a range box. FIG. 9A shows an example in which a range box 88 is applied to the vehicle (object). In this case, the vertices of the range box 88 are subjected to conversion.

Figure 9B:
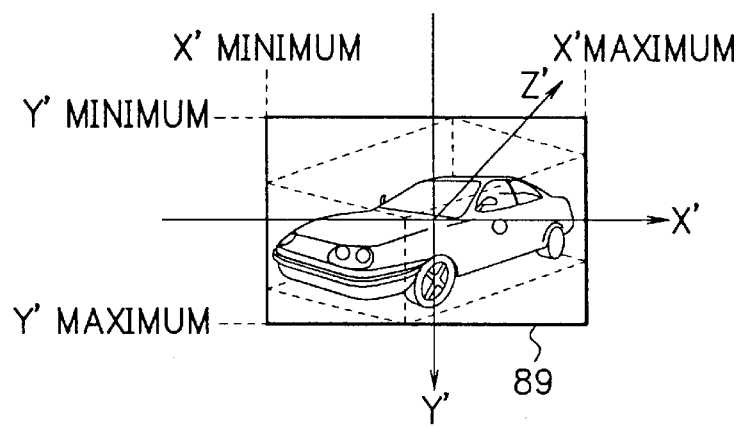
FIG. 9B is a diagram showing a range frame of the object.

After the range box 88 is transformed into the viewpoint coordinate system, it will have its minimum and maximum values in the X' direction and the Y' direction respectively determined. Those four values are projected on the X'Y' plane of the viewpoint coordinate system by an orthogonal projection, on the basis of which a range frame 89 being a rectangular of a minimum size is calculated while it includes the four points being projected. FIG. 9B shows an example in which the range frame 89 is calculated out from the range box 88.

The viewpoint position is determined, on the basis of the object horizontal angle of visibility 99 and the vertical angle of visibility 96, the clipping plane, i.e. the horizontal angle of visibility 62 and the vertical angle of visibility 66 of the display screen in FIG. 2, and a viewing volume of the target recommend vector, so that the target object is displayed with a desired viewing volume.

As to an example of a method for determining the viewpoint position, the following method can be considered. First, provided that a provisional viewpoint is arranged on the Z' axis, the viewpoint is shifted along the Z' axis. Then a horizontal limit point 97 is determined as a point where the object horizontal angle of visibility 99 of the range frame and the horizontal angle of visibility 62 of the system shown in FIG. 2 become equal. Likewise, a vertical limit point 98 is determined as a point where the object vertical angle of visibility 96 of the range frame and the vertical angle of visibility 63 of the system shown in FIG. 2 become equal. The horizontal limit point 97 and the vertical limit point 98 are then compared, and the one having a larger absolute value is to be set as Z". Applying the values of the aforementioned x', y', $\theta$, $\phi$, x0, y0, z0, and the value of Z", an inverse coordinate transformation by formula (2) is carried out so as to determine the position coordinates (x, y, z) of the viewing point on the space coordinate system.

$$x=x0+(1+W)(-1)[x'\cos\theta-y'\sin\theta\sin\phi+Z''\sin\theta\cos\phi]$$

$$y=y0+(1+W)(-1)[y'\cos\phi+Z''\sin\phi]$$

$$z=z0+(1+W)(-1)[-x'\sin\theta-y'\cos\theta\sin\phi+Z''\cos\phi\cos\theta] \quad (2)$$

In this case, W is a viewing volume indicating the occupation ratio in the range frame 100 within the screen display. Here, the definition of W regarding its range and a state of screen display under each value within the range can be decided voluntarily. For instance, when W=0, it means that the range frame exactly matches with the whole screen. In the present embodiment, W takes a range of $-1<W<\infty$, and where W is 0, the frame of range is 100, meaning that the object is displayed in a size exactly occupying the whole portion of the display screen. The viewpoint position is set such that as W approaches $-1$, the range frame, i.e. the object, is enlarged; and as it approaches $\infty$, the range frame, i.e. the object, is reduced.

In this way, in respect with a three-dimentional space viewpoint control system, when the user selects a target object while working through the three-dimentional space, the user does not have to go through any trouble carrying out any manual adjustment operation on the viewpoint, but recommend viewing point information i.e. viewpoint position, viewing direction, etc. appropriate for viewing the contents are automatically generated. Therefore, with the application of this system, for example, the target object is controlled to be displayed in a most desirable and adequate direction and size, on the basis of the intentions of the content designer. Accordingly, the user is able to view the contents which are reflecting the intentions of the content designer.

Next, with reference to FIGS. 1, 5, 6, 7A–7H, 8A–8B, 10, and 11A–11B, a detailed explanation will be given on the viewing point order calculation means 23.

Figure 10:
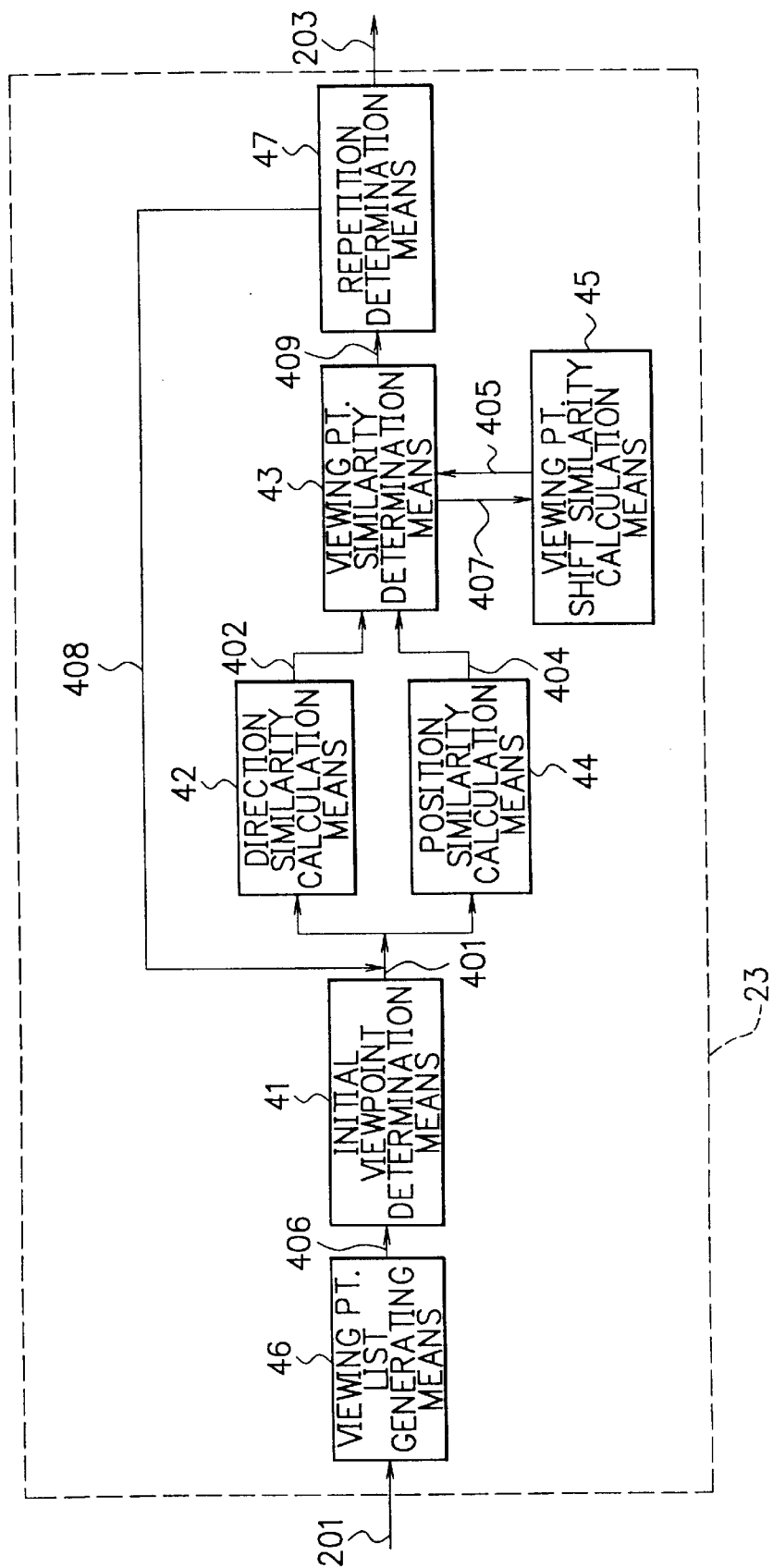
FIG. 10 is a block diagram showing a configuration of a viewing point order calculation means.

FIG. 10 is a block diagram explaining a structure of the viewing point order calculation means 23. The viewing point order calculation means 23 comprises: a viewing point list generating means 46; an initial viewpoint determination means 41; a direction similarity calculation means 42; a position similarity calculation means 44; a viewing point similarity determination means 43; a viewing point shift similarity calculation means 45; and a repetition determination means 47.

The viewing point list producing means 46 collects a plurality of pieces of viewing point information 201, which are generated by the viewpoint information determination means 21, so as to produce a viewing point list 406 per object. The initial viewing point determination means 41 determines a viewpoint position where a visualization of the target object begins, as an initial viewpoint, so as to produce an initial viewpoint added viewing point list 401. The direction similarity calculation means 42 compares each viewing point with the initial viewpoint in terms of the viewing direction, referring to the initial viewpoint added viewing point list 401, so as to generate direction similarity information 402. The position similarity calculation means 44 compares each viewing point with the initial viewpoint in terms of the position, making reference to the initial viewpoint added viewing point list 401, so as to generate position similarity information 404. The viewing point similarity determination means 43 receives the direction similarity information 402 and the position similarity information 404, on the basis of which it determines the most resembling viewing point as the first viewing point. The viewing point similarity determination means 43 then add this information to the viewing point list information, so as to generate a partial order determination list 403. When there are more than two viewing points equally resembling the initial viewpoint as a result of the comparison of each viewing point with the initial viewpoint at the viewing point similarity determination means 43, the viewing point shift similarity calculation means 45 compares the viewing points in question with the initial viewpoint in terms of the shifting status, so as to transmit shift similarity information 405. The repetition determination means 47 receives the partial order determination list 403 and determines whether the viewing points of the whole target objects have been given their order. When there are undetermined viewing points remaining, the partial order determination list 403 is outputted to the direction similarity calculation means 42 and the position similarity calculation means 44 as a process repeat list 408. On the other hand, when the repetition determination means 47 determines that the whole viewing points are given their order, the partial order determination list 403 is outputted as viewing point order information 203.

The initial viewpoint determination means 41 first determines the initial viewpoint where visualization of the object begins based on a desired standard, so as to output the information as the initial viewpoint added viewing point list 401.

In a first example of determining the initial viewpoint, the initial viewpoint is determined on the basis of the viewpoint information obtained from the system at the time when the initial viewpoint determination means 41 is operating in response to the user's object selecting operation etc.

In a second example of determining the initial viewing point, the initial viewpoint is determined as being a viewing point corresponding to an initial recommend vector, which is especially selected among a plurality of recommend vectors as they are set.

Next, on the basis of the initial viewpoint added viewing point list 401, the viewing point with the closest resemblance to the initial viewpoint will be selected. At the direction similarity calculation means 42, each viewing point is compared with the initial viewpoint, so as to calculate the similarity of each viewing point to the initial viewpoint in terms of the viewing direction. The result is then outputted as the direction similarity information 402. In this respect, in determining the similarity of the viewing point and the initial viewpoint, for example, the inner product between a unit vector of each viewing direction is calculated, so as to determine the one with the largest value as having the closest similarity to the initial viewpoint in terms of the viewing direction.

The position similarity calculation means 44, then calculates the similarity between each viewing point and the initial viewpoint in terms of the viewing position, and outputs the result as the position similarity information 404. As one way of determining the viewing point most similar to the initial viewpoint in respect with the viewing position, for instance, the viewing point with the closest distance to the initial viewpoint can be considered as being most similar to the initial viewpoint in terms of the viewing position.

In the viewing point similarity determination means 43, the direction similarity information 402 and the position similarity information 404 are applied in calculating the overall similarity between each viewing point and the initial viewpoint, so as to select the viewing point most resembling the initial viewpoint in the overall sense as a viewing point (a first viewing point) to be used in the very first visualization. For example, it is possible to use the following expression in calculating the overall similarity.

> viewing point similarity=position similarity×(direction similarity+ 1)2=1÷viewing point distance×(inner product+1)÷2

As a result of what is determined by the viewing point similarity determination means 43, when a plurality of viewing points having equally closest resemblance to the initial viewpoint are being detected, those viewing points are then to be called candidate viewing points. At the viewing point shift similarity calculation means 45, a calculation is executed to determine similarity between a shift direction (shift direction before reach) reaching each initial viewpoint, and a shift direction (shift direction after reach) reaching the candidate viewing point from the initial viewpoint, according to which the similarity of each candidate viewing point to the initial viewpoint is determined and outputted as the shift similarity information 405. One example of determining the resemblance between each candidate viewing point and the initial viewpoint is to calculate the inner product between a unit vector of the shift direction before reach and a unit vector of the shift direction after reach for each candidate viewing point, on the basis of which the candidate viewing point having the largest value is determined as most similar to the initial viewpoint.

Next, the viewing point similarity determination means 43 is to calculate the similarity between each candidate viewing point and the initial viewpoint in terms of the shifting status, on the basis of the shift similarity information 405. Then the candidate viewing point with the closest resemblance to the initial viewpoint is selected as a second viewing point. One way of calculating the viewing point shift similarity, for example, is to apply the following expression.

viewing point shift similarity=position similarity×(shift direction inner product+1)÷2

In accordance with the above-described process, the initial viewpoint and the first viewing point which most resembles the initial viewpoint are determined, after which the viewing point list being rearranged at the repetition determination means 47 to become suitable for giving out the second viewing point is outputted as a process repeat list 408 to the direction similarity calculation means 42 and the position similarity calculation means 44, respectively. Then the second viewing point is determined on the basis of the first viewing point in the same way as the first viewing point which is determined on the basis of the initial viewpoint.

The same process is repeated in determining a third viewing point, a fourth viewing point, a fifth viewing point, and so on, until the repetition determination means 47 concludes that the entire viewing points included in the viewing point list are given their order. At the point where the repeating process is completed, the repetition determination means 47 outputs the order information of the entire viewing points as viewing point order information 203.

Figure 11B:
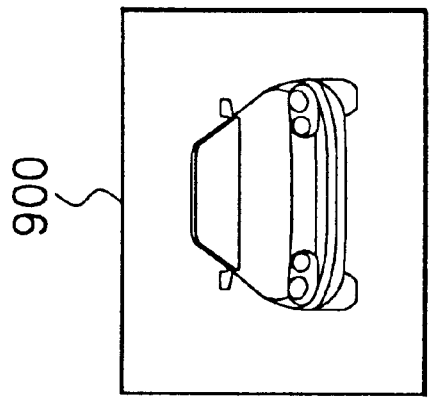
FIG. 11B is a diagram showing a state of a screen display when viewed from the initial viewpoint shown in FIG. 11A.
Figure 11A:
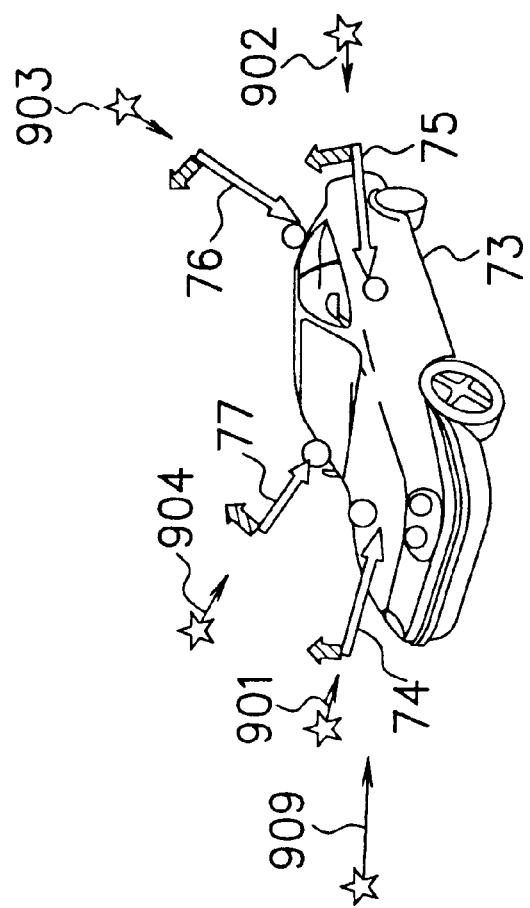
FIG. 11A is a diagram showing an initial viewpoint, a number of viewing points and recommend vectors for explaining an order arrangement of the viewing points.

The description will be given on determining the first viewing point referring to FIG. 11A and FIG. 11B. Both figures explain a case in which viewing points (a), (b), (c), and (d) are set at the vehicle (object) 73's front, left, rear and right, respectively, on the basis of recommend vectors (a), (b), (c), and (d) (similar to vectors shown in FIGS. 7A, 7C, 7E, 7G. Further, it is assumed that the user has selected the vehicle (object) 73 by a pointing operation when the viewpoint becomes exactly the initial viewpoint 909. In FIG. 11A, among the constituents of the viewpoint, only the viewpoint position, and the viewing direction, indicated as star marks, and solid line arrows, respectively, are shown. FIG. 11B shows a state of a screen display 900 when viewed from the initial viewpoint 909.

In this case, as it is obvious from looking at the figure, the viewing point most similar to the initial viewpoint 909 in terms of the position is a viewing point (a) (901), meaning that the viewing point (a) (901) is the closest to the initial viewing point. At the same time, the viewing point most resembling the initial viewpoint 909 in terms of the viewing direction is also the viewing point (a) (901), meaning that the inner product between the viewing point (a) (901) unit vector of the viewing direction is the largest among others. Accordingly, this viewing point (a) (901) is to be determined as the first viewing point.

On the other hand, when comparing the screen display of each viewing point with the screen display of the initial viewpoint by referring to FIGS. 7B, 7D, 7F, 7H and FIG. 11B, it is obvious that the screen display most resembling the screen display of the initial viewpoint 909 (FIG. 11B) is the one corresponding to the viewing point (a) (901) (FIG. 7B).

Comparing this case where the viewing point (a) (901) is the first viewing point with the case where another viewing point (b) (902), (c) (903) or (d) (904) is the first viewing point, it is obvious that the image transition from the initial viewpoint 909 to the viewing point (a) (the first viewing point) is the smoothest among others. In this way, on the basis of the viewing point order arrangement method applying the above-described similarity comparison, the image transition becomes smoother, meaning that order of the viewing points is determined such that the viewer is capable of viewing the image with the least sense of incompatibility.

One notable characteristic of the viewing point order calculation means 23 is that the above-described process is all carried out automatically on the basis of the recommend vector. Because of this viewing point order calculation means 23, the user does not have to trouble himself/herself to do any operation for a viewpoint transition, but the user can benefit from information visualization in which the user experiences an automatic walk-through on a corridor covering a plurality of viewing points generated from a plurality of recommend vectors which reflect the content designer's intentions, while not perceiving any sense of incompatibility.

In the following, a description on the relevant information visualization control means 24 and the viewpoint pass generating means 25 will be given in detail, while referring to FIGS. 1, 12 and 13A–13E. FIG. 12 is a block diagram showing a structure of the relevant information visualization control means 24.

The relevant information visualization control means 24 comprises a relevant information generating means 51, a projection information acquisition means 53, an image correction means 54, and a viewing point correction means 55.

In compliance with the relevant information indication instruction 207 from the user operation management means 12, the relevant information generating means 51 generates the relevant information visualization information 209 which is to be used in visualizing the relevant information about the target object. The projection information acquisition means 53 receives the object image information 210 concerning the object's range box, etc. from the three-dimensional space visualization means 13. Then the projection information acquisition means 53 calculates projection information 503 regarding a display position of the image in case where the image of the object is projected on the display screen on the basis of the object image information 210. On the basis of the projection information 503, the object image correction means 54 generates object image correction information 504 regarding a position shift, display magnification, etc. which is to be used in correcting the object image. On the basis of the projection information 503 and the object image correction information 504, the viewing point correction means 55 generates the viewing point correction information 204 for correcting space information of the viewing point.

The relevant information visualization control means 24 is applied when the object and the relevant information are to be displayed on the same screen at the same time. The relevant information visualization control means 24 automatically corrects a display magnification, a display position, etc. on the basis of the image of the relevant information, so as to prevent the images of the object and the relevant information from overlapping with each other, and also preventing production of any unnecessary blank space.

Figure 13C:
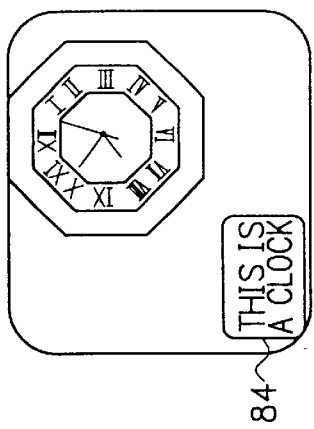
FIG. 13C is a diagram showing a situation where there is a large portion of blank space surrounding the object and the relevant information.
Figure 13E:
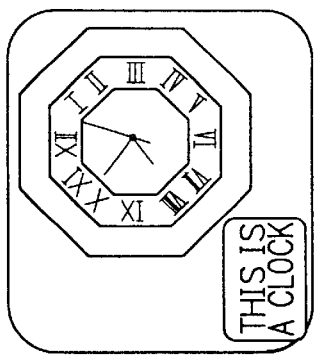
FIG. 13E is a diagram showing a result of a process by the relevant information visualization control means regarding the situation shown in FIG. 13C.
Figure 13B:
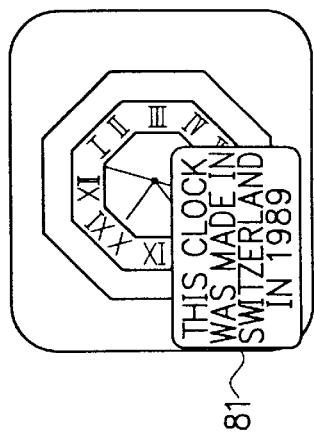
FIG. 13B is a diagram showing a situation in which the object and the relevant information are overlapping with each other.
Figure 13D:
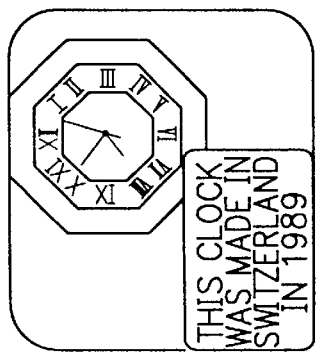
FIG. 13D is a diagram showing a result of a process by the relevant information visualization control means regarding the situation shown in FIG. 13B.
Figure 13A:
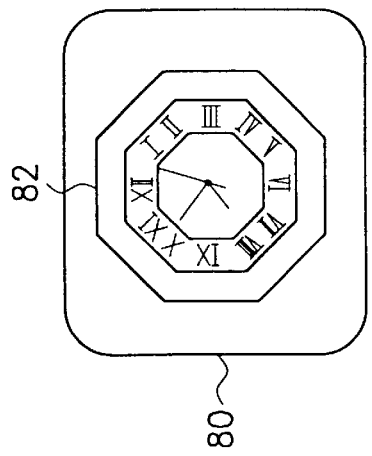
FIG. 13A is a diagram showing an object image in a display screen which is to be displayed together with relevant information.

For instance, when it is determined that the object and the relevant information will result in overlapping with each other as shown in FIG. 13B, the relevant information determination means 24 corrects the object image so that the object and the relevant information would not interfere with each other and would look like FIG. 13D.

On the other hand, when it is determined that a large portion of blank space will be generated around the object and the relevant information as shown in FIG. 13C, the relevant information visualization control means 24 corrects the object image as shown in FIG. 13E so that the object and the relevant information are arranged proportionally, without any unnatural blank space surrounding them.

In case when the relevant information indication instruction 207 is outputted from the user operation management means 12 in compliance with the operation by the user, the relevant information generating means 51, for example, requests an external data base to conduct a search in order to obtain certain desired information, and transmits the result to the three-dimensional space visualization means 13 and the object image correction means 54 respectively, as the relevant information visualization information 209 which is subjected to be displayed in the three-dimensional virtual space. At the same time, the projection information acquisition means 53 receives the object image information 210 including three-dimensional space coordinates concerning eight vertices of an object's range box displayed on the screen. Then the projection information acquisition means 53 projects the coordinates of each vertex on the clipping plane 61 shown in FIG. 2, i.e. the display screen, so as to calculate a minimum size rectangle (basic rectangle) including the projected eight points on the display screen, which is outputted as the projection information 503.

Next, at the object image correction means 54, a rectangle having a similar shape to the basic rectangle having the largest size to fit in the display screen and not overlapping with the relevant information is determined. This rectangle is referred to as a maximum rectangle. Then a display magnification of the maximum rectangle is calculated by applying the following expression.

$$\text{display magnification} = \text{length of maximum rectangle} \div \text{length of basic rectangle}$$

Then among the four vertices at the corners of the display screen, the vertex which keeps the longest distance between the center of the relevant information will be considered as an object display reference point. Further, in the projection area, the display magnification as given above is applied after the center coordinates of the projection area are fixed. Then the display position of the object is determined, while the projection area having the above display magnification applied is in effect in the extent not overhanging the actual display screen, such that the distance between the object display reference point and the center of the projection area becomes the shortest.

The object image correction means 54 then outputs the display magnification and the display position being determined as above as the object image correction information 504. The viewing point correction means 55 outputs the viewing point correction information 204 which is used in correcting the constituents of the viewing point being set with respect to the target object on the basis of the object image correction information 504.

Figure 14A:
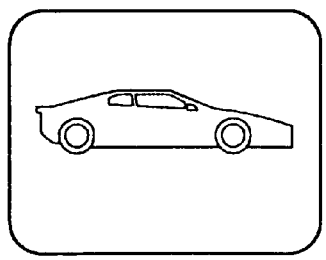
FIG. 14A is a diagram showing an object which is to be displayed together with relevant information.
Figure 14B:
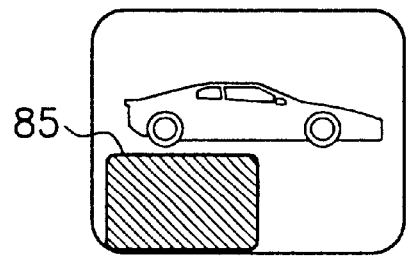
FIG. 14B is a diagram showing a result of a process by the relevant information visualization control means, where the object shown in FIG. 14A is displayed together with the relevant information.
Figure 14C:
FIG. 14C is a diagram showing an object which is to be displayed together with relevant information.
Figure 14D:
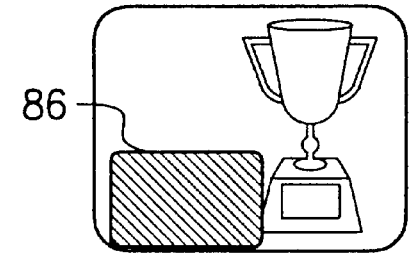
FIG. 14D is a diagram showing a result of a process by the relevant information visualization control means, where the object shown in FIG. 14C is displayed together with the relevant information.

By the above-described process, a size and a display position of the object are automatically corrected. All sizes of objects including a wide object as shown in FIG. 14A and a tall object as shown in FIG. 14C can be displayed along with their relevant information without overlapping with each other on the same screen. Further, a blank space around the object and its relevant information can be reduced to a minimum.

Next, the viewpoint pass generating means 25 uses the viewing point order information 203 from the viewing point order calculation means 23 and the viewing point correction information 204 from the relevant information visualizing control means 24, so as to calculate a viewpoint shifting pass (viewpoint pass) for taking a round with a plurality of viewing points. The viewpoint pass is calculated by firstly setting a plurality of reference points (pass nodes) and then linking up those pass nodes. Further, for each viewpoint pass node, values for the constituents of a viewpoint (e.g. viewpoint position, viewing direction, viewing information, etc.) are being set.

As to the way of linking the pass nodes, one example would be to link the pass nodes by changing the value of each constituent with respect to adjacent nodes by n equal parts using a linear function. Furthermore, with respect to a second example of effecting a more smooth linking among the pass nodes, there is a way of linking m nodes in a nonlinear form using Bezier function ("Graphics and Man-machine System" pp. 96–101, Iwanami Bunko, Publishers, Tokyo).

The viewpoint pass generating means 25 outputs to the 3D space visualization means 13 the result from the above process as viewing point pass information 205 (including the viewing point pass information 204). Accordingly, visualization of the object and its relevant information, and changes in the constituents of the viewpoint will actually reflect upon the three-dimensional space. Then as described with reference to FIGS. 7A–7H, 11, 13A–13E, and 14A–14D, the image will be displayed on the three-dimensional space display device 15.

Furthermore, the present invention is not limited to the embodiment as described above, but can be modified into various forms. For instance, the constituents of the recommend vector can be selected in terms of a number and kind depending on the object. Furthermore, in terms of displaying the relevant information, the display region can be changed on the basis of a size of the object.

In accordance with the present invention, viewpoint information for viewing visualized information is figured out from a plurality of recommend vectors which are set in such a way that they reflect the content designer's intentions. Then on the basis of such viewpoint information, the visualized information is displayed. Therefore, even in case when the contents are dynamically switched or disposition thereof are altered, the user does not have to go through some complicated manual adjustment operation in order to view the visualized information which reflects the intentions of the content designer or the one who has set the recommend vectors.

Another advantage of the present invention would be that in providing relevant information of the contents to the user, the user can view the object and the relevant information at the same time on the same screen without suffering from any sense of incompatibility, which is normally caused by the image of the object and the relevant information interfering with each other. This is possible by determining a viewing point pass on the basis of image sizes of the object and the relevant information.

In this way, an improved interface between the provider and the user is established, and thus the user is able to use the service more easily. In conclusion, with the application of the present invention, the provider is able to provide the user with visualized information in a three-dimentional space in a more reliable and efficient way.

While a preferred embodiment of the invention has been described using specific terms, such description is for illustrative purposes only, and it is to be understood that changes and variations may be made without departing from the spirit or the scope of the following claims.

What is claimed is:

1. An in-space viewpoint control device applied in an information visualization system for providing a user with visualized information by embedding various contents as object images in desired places in a space image arranged in a virtual space so as to display the object images in turns along with the space images, comprising:
   a recommend vector setting means for setting recommend vector information which designates a recommended viewpoint of the object image; and
   a viewpoint information determination means for determining viewpoint information for the user, which is used for displaying the object image on the basis of recommend vector information.

2. An in-space viewpoint control device as claimed in claim 1, further comprising:
   a viewing point order determination means responsive when a plurality of recommend vectors are set with respect to the object image, as it assigns a rotation order to each viewing point of the object image which is determined by each vector; and
   a viewing point shifting means for shifting the viewing point of the object image in accordance with the rotation order.

3. An in-space viewpoint control device as claimed in claim 1, further comprising:
   a relevant information visualization control means responsive when the user selects to have relevant information of the object displayed together with the object image on the same screen, as it adjusts display status of the object and the relevant information so that they do not interfere with each other on the screen.

4. An in-space viewpoint control device as claimed in claim 2, further comprising:
   a relevant information visualization control means responsive when the user selects to have relevant information of the object displayed together with the object image on the same screen, as it adjusts display status of the object and the relevant information so that they do not interfere with each other on the screen.

5. An in-space viewpoint control device as claimed in claim 1, wherein:
   the viewpoint information determination means determines at least either one between a viewing point position and the viewing direction as viewpoint information in viewing the image of the object.

6. An in-space viewpoint control device as claimed in claim 2, wherein:
   the viewpoint information determination means determines at least either one between a viewing point position and the viewing direction as viewpoint information in viewing the image of the object.

7. An in-space viewpoint control device as claimed in claim 3, wherein:
   the viewpoint information determination means determines at least either one between a viewing point position and the viewing direction as viewpoint information in viewing the image of the object.

8. An in-space viewpoint control device as claimed in claim 2, wherein:
   the viewing point shifting means determines a course of shifting for the viewing point of the object image on the basis of the rotation order, so as to shift the viewing point along the course of shifting.

9. An in-space viewpoint control device as claimed in claim 3, wherein:
   the viewing point shifting means determines a course of shifting for the viewing point of the object image on the basis of the rotation order, so as to shift the viewing point along the course of shifting.

10. An in-space viewpoint control device as claimed in claim 5, wherein:
    the viewing point shifting means determines a course of shifting for the viewing point of the object image on the basis of the rotation order, so as to shift the viewing point along the course of shifting.

11. An in-space viewpoint control device as recited in claim 1, further comprising
    a recommend vector database means for setting a physical media and storing the generated recommend vectors into the physical media.

12. An in-space viewpoint control device applied in an information visualization system for providing a user with visualized information by embedding various contents as object images in desired places in a space image arranged in a virtual space and displaying the object images in turns along with the space image, comprising:
    a recommend vector setting means for setting recommend vectors being pieces of information about one or more view points used in displaying the object image in a way reflecting intentions of a content designer;
    a recommend vector storing means for storing the recommend vectors being set by the recommend vector setting means; and
    a viewpoint information determining means for determining viewpoint information, which is used in establishing a viewing path of the object image, based on the recommend vectors taken out from the recommend vector storing means by an operation of the user, thus displaying the object image following the viewing path in the way reflecting the intentions of the content designer.

13. The in-space viewpoint control device as claimed in claim 12, further comprising:
    a viewing point order determination means responsive to a case when a plurality of recommend vectors are set with respect to the object image, assigning a rotation order to each viewing point of the object image which is determined by each recommend vector; and
    a viewing point shifting means for shifting the viewing point of the object image in accordance with the rotation order.

14. The in-space viewpoint control device as recited in claim 12, wherein the recommend vector comprises:
    a viewing direction for recording a viewing direction;
    a viewing center for recording a point of assigned position on the object corresponding to a center of a display screen;
    a viewing position for recording rotation information of a visual field quadrangular pyramid with a viewpoint being its axis; and
    a viewing volume for recording a size of the object on the display screen.

15. The in-space viewpoint control device as claimed in claim 12, further comprising
    an operation input means for the user or the content designer to input information for operating the object, the operation input means comprising:
    an object operation means for operating the object; and
    an operation information input means inputting operation information.

16. The in-space view point control system as claimed in claim 12, wherein the recommend vector storing the means comprises a recording medium for storing the recommend vectors.

17. The in-space viewpoint control device as claimed in claim 12, wherein the viewpoint information determination means comprises:

an object information acquisition means for generating spatial object information being combined information of recommend vectors taken out from the recommend vector storing means by an operation of the user and information on the object in virtual space;

a view angle calculation means for generating information on view angle based on a screen environment of the system;

a viewing direction determination means for determining information on viewing direction based on the spatial object information and the information on view angle;

a viewpoint position calculation means for calculating information on viewpoint spatial position based on the spatial object information and the information on viewing direction; and a viewing point information generating means for generating information on viewing point based on the information on viewing direction and viewpoint spatial position.

* * * * *